Figure 1:
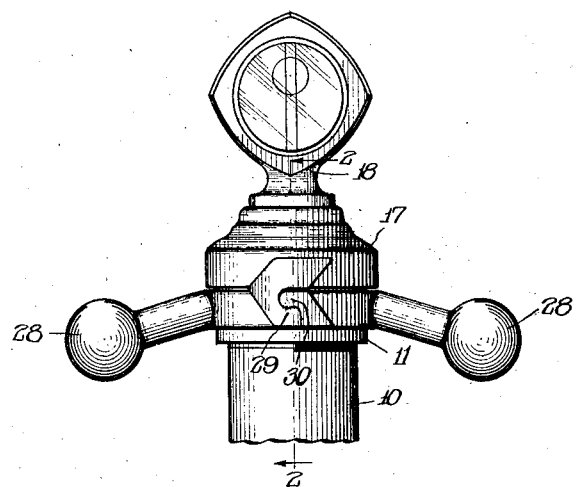

April 3, 1928.

J. F. WHITE 1,665,004

AUTOMOBILE RADIATOR CAP

Filed April 11, 1925

Witness:
R. Burkhardt

Inventor:
John F. White,

Patented Apr. 3, 1928.

1,665,004

UNITED STATES PATENT OFFICE.

JOHN F. WHITE, OF CHICAGO, ILLINOIS, ASSIGNOR TO WHITE PRODUCTS COMPANY, OF CHICAGO, ILLINOIS, A CORPORATION OF ILLINOIS.

AUTOMOBILE RADIATOR CAP.

Application filed April 11, 1925. Serial No. 22,270.

This invention relates to automobile radiator closure caps of the type designed for permanent connection to the radiator spout and having a hinged lid giving access to the interior of the latter. Such devices are sold extensively as accessory equipment designed to supplant the ordinary radiator cap furnished as a part of the standard equipment. One of the requirements of such a device is susceptibility of attachment to the radiator spout without employment of special tools and without the necessity for reforming or adapting the radiator spout to it. Having in view the fulfillment of this requirement, a further object of my invention is the provision of such a device particularly qualified to form an effective seal for the radiator spout and to resist or avoid deterioration of the seal-forming elements incident to use.

Another object of the invention is the provision of a closure of such type which is qualified both to form an extremely tight seal for the radiator spout, and permit opening, when required, with great facility and without danger of injury to the fingers of the operator.

Another object of the invention is the provision of a device having the qualifications above described and the construction of which lends itself to embodiment in graceful design and contour, adapting it to function as an embellishment of the vehicle.

A further object of the invention is the provision of an article of the sort described which may be constructed at a low cost.

Other and further objects of the invention will be pointed out hereinafter, indicated in the appended claims, or obvious to one skilled in the art upon an understanding of the present disclosure. For the purpose of this application I have elected to show herein certain forms in which the invention may be embodied, but it is to be understood that the same are here presented for the purpose of illustration only and are not to be accorded any interpretation having the effect of limiting the invention short of the most comprehensive scope indicated in the claims.

Figure 2:
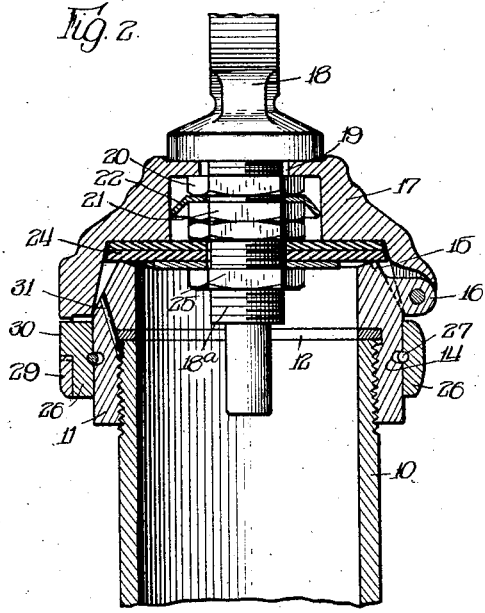

In the drawing forming a part of this specification,

Fig. 1 is a front elevational view of the device as it appears in position on a radiator spout or nipple, Fig. 2 is a sectional elevation on line 2—2 of Fig. 1.

The art is familiar with various types of automobile radiator caps designed to be screwed on to the radiator spout but so equipped that they cannot be backed off, the object being to provide a theft preventing device for retaining an indicating instrument or ornament as well as the closure. Novel and distinctive features of the present invention reside in the provision of a device having laterally extending arms whereby the device may be turned so as to set it up on the screw threaded radiator spout, the arms, when the device is in position, constituting decorative features. The leverage afforded by the arms is utilized, moreover, in attaining the important additional advantage of a very tight seal between the hinged lid forming the closure for the device and the member which affords the opening for filling the radiator. The mechanical advantage accruing from this feature permits the use of hard packing, such as a steam packing, for closing the radiator spout, which packing may be of such quality and material as to be able to resist effectively any deteriorating or disintegrating influences of the steam, hot water, and the various chemicals commonly employed in automobile radiators for preventing freezing in cold weather.

With these general observations, the invention will be further understood by reference in detail to the illustrative embodiment. Let it be understood that the reference character 10 designates the radiator spout,—the form illustrated may be representative of any number of standard spouts which are suitably screw threaded, either internally or externally, for attachment of the closure cap. My improved device comprises an attaching bushing 11, which may be screw threaded either internally or externally for seating engagement with any one of the various standard spout threads. In providing the devices for the market, those bushings will be furnished with the various requisite threadings, said bushings being the only variable element in the construction. Within this bushing is carried a compressible seating washer 12, preferably of lead, adapted to bind upon the top of the radiator spout. The bushing is provided with a peripheral groove 14 for cooperation with a connecting ring, and it terminates at its upper extremity in a sealing seat 15. It also has a radially projecting hinge lug 16 to which is hinged the closure cap 17. The cap affords a seat for the display device 18, and has an axial aperture 19 for accommodation of the post or stem 18ª thereof. A theft preventing connection, such as the nuts 20 and 21 and the binding washer 22, may be provided for securing the display device to the cap, the stem 18ª also affording means of connection for the sealing gasket 24, retained in place by the nut 25 and adapted to cover the open end of the bushing and seat upon the sealing seat 15 thereof. This gasket may be made of a relatively hard packing material and of such texture and composition as to resist the hot steam and the vapors from anti-freezing mixtures. The gasket may be made in two parts, with the resistant packing material as the lower, and a packing of more elastic material, such as rubber, above it. The thickness of the gasket is such that it will bind with heavy compression upon the seat 15 when the cap is in closed position, and it is preferable that the gasket be supported by an overlying portion of the cap so as to secure this heavy compression upon the seat of the bushing. The compression may be increased, of course, by the insertion of shims or washers behind the gasket.

Below the lower margin of the cap 17 a collar 26 is rotatably mounted on the bushing 11 by means of a spring ring 27. This collar is equipped with laterally extending handles 28 whereby it may be rotated, said handles being of such extent as to afford substantial leverage. On the side opposite the hinge lug 16, the cap is provided with a catch member 29 adapted for engagement with a cooperating catch member 30 carried on the collar 26. These catch members are engageable and disengageable by rotation of the collar member 26 on the bushing 11, and their form is such that as moved to engaging position under leverage from the arms 28, they will cooperate with each other to exert a wedging or camming action effective to compress the gasket 24 tightly between the cap and the top of the bushing. The form of the catch members also is such that when they reach their ultimate engaged position they have a detent interengagement tending to hold them against separation. Such separation may be effected with comparative ease, however, by counterclockwise rotation of the collar through the leverage afforded by the handles 28.

In the operation of the device, it is in the first instance attached to the radiator spout by being set up tightly thereon to an extent sufficient to compress the seating washer 12 sufficient to form a hermatic seal between the bushing and the spout and to position the hinge 16 at the rear. This turning of the device to seated position may be accomplished effectively through the leverage afforded by the handles 28 when the catch members 29 and 30 are in engagement. Being turned to the desired position, the device may be secured against removal by insertion of a suitable pin 31, effective to key the bushing to the spout. The device thus becomes a permanent fixture on the vehicle and effectively retains the display device 18 by virtue of the connection between them. When it is desired to open the cap, the catch members 29 and 30 are disengaged by counterclockwise rotation by the collar 26, permitting the cap to be swung back on its hinge. The cap is closed by a reversal of the operation, therein the camming action of the members 29 and 30 and the leverage of the handles 28 are effective to attain a heavy compression of the gasket on the bushing so that a hermatic seal is formed. It will be observed that there is no rotation of the gasket upon the sealing seat while they are in engagement. This is a feature of advantage in preserving the integrity of the packing material and hence the tightness of the seal. These are features of particular importance in connection with condensing cooling systems, wherein the entire system must be completely closed in order to insure satisfactory operation. A great advantage resides also in the ease with which the device may be operated for opening and closing, it presenting a marked contrast in this respect to many forms which are secured by thumb screws, spring catches and the like, which have to be operated with the ends of the fingers and require more or less force for their manipulation, and offer great opportunity for injury to the fingers of the operators.

What I claim is:

1. A radiator cap comprising a bushing for connection to the radiator nipple, a cap hinged to the bushing for closing the end thereof, a collar rotatable on the bushing and cooperating catch members on the collar and cap engageable by rotation of the collar for holding the cap closed and limiting rotation of the collar relative to the cap in one direction.

2. A radiator cap comprising a bushing screw threaded for attachment to the radiator nipple, a cap hinged on the bushing for closing its end, a collar rotatable on the bushing and having an operating lever, and cooperating catch members on the collar and cap engageable by rotation of the collar for holding the cap closed and securing the bushing for rotation in one direction with the collar.

3. A radiator cap comprising a bushing, a cap hinged thereto, a packing member carried in the cap for sealing cooperation with the bushing, a collar rotatable on the bushing and having an operating lever, and a catch member carried on the collar and engageable with the cap by rotary movement of the collar to compress the packing member on the bushing.

4. A radiator cap comprising a tubular member, a cap hinged thereto for closing the end thereof, a collar member adjustable on the tubular member and having projecting handles, and members engageable by movement of the collar for latching the cap in closed position and retaining the handles in a definite position relative to the tubular member.

In testimony whereof I have hereunto subscribed my name.

JOHN F. WHITE.